United States Patent
Getz

(10) Patent No.: US 6,326,102 B1
(45) Date of Patent: Dec. 4, 2001

(54) HIGH RATE ELECTROCHEMICAL CELL WITH INCREASED ANODE-TO-CATHODE INTERFACE SURFACE AREA

(75) Inventor: Dale R. Getz, Westlake, OH (US)

(73) Assignee: Eveready Battery Company, Inc., St. Louis, MO (US)

(*) Notice: Subject to any disclaimer, the term of this patent is extended or adjusted under 35 U.S.C. 154(b) by 0 days.

(21) Appl. No.: 09/198,802

(22) Filed: Nov. 24, 1998

(51) Int. Cl.⁷ ..................................................... H01M 6/44
(52) U.S. Cl. ............................................. 429/132; 429/165
(58) Field of Search ................................. 429/131, 132, 429/140, 164–169, 224, 229; 29/623.1

(56) References Cited

U.S. PATENT DOCUMENTS

| | | | |
|---|---|---|---|
| 2,480,839 | 9/1949 | Daniel | 136/107 |
| 2,960,558 | 11/1960 | Marsal et al. | 136/107 |
| 3,335,031 | * 8/1967 | Kordesch . | |
| 3,490,951 | 1/1970 | George | 136/121 |
| 4,042,756 | * 8/1977 | Goebel et al. . | |
| 4,315,062 | 2/1982 | Clarizio | 429/246 |
| 5,017,442 | * 5/1991 | Watanabe et al. . | |
| 5,501,924 | 3/1996 | Swierbut et al. | 429/224 |
| 5,989,743 | * 11/1999 | Yamashita . | |
| 6,143,446 | * 11/2000 | Davis et al. . | |
| 6,153,335 | * 11/2000 | Vutetakis et al. . | |
| 6,207,322 | * 3/2001 | Kelsey et al. . | |

OTHER PUBLICATIONS

Batteries:Manganese Dioxide edited by Karl V. Kordesch, vol. 1, Union Carbide Corporation, Battery Products Division, Research Laboratory, Parma, Ohio, Marcel Dekker, Inc., New York 1974, p. 272, Title page, book cover, No month available, 1974.*

* cited by examiner

*Primary Examiner*—Carol Chaney
*Assistant Examiner*—Susy Tsang
(74) *Attorney, Agent, or Firm*—Stewart A. Fraser

(57) ABSTRACT

An electrochemical cell construction having a large anode-to-cathode interfacial surface area to realize improved high rate service performance in an easy-to-manufacture construction. A first electrode, such as the cathode, is formed having a conductive current collector integrally embedded therein. Separator material is disposed on both the inner and outer cylindrical walls of the first electrode. An outer electrochemically active material covers the outer separator material outside of the first electrode and an outer insulation is layered on top of the outer electrochemically active material to form a cathode bobbin. The cathode bobbin is disposed into a container having a closed bottom end and an open top end. A second electrode, such as an anode, is disposed in the inner cylindrical volume formed in the first electrode and a conductive path is provided between the outer electrochemically active material and the second electrode. A current collector is disposed in contact with the second electrode, and a cover assembly is assembled to the open end of the container.

4 Claims, 7 Drawing Sheets

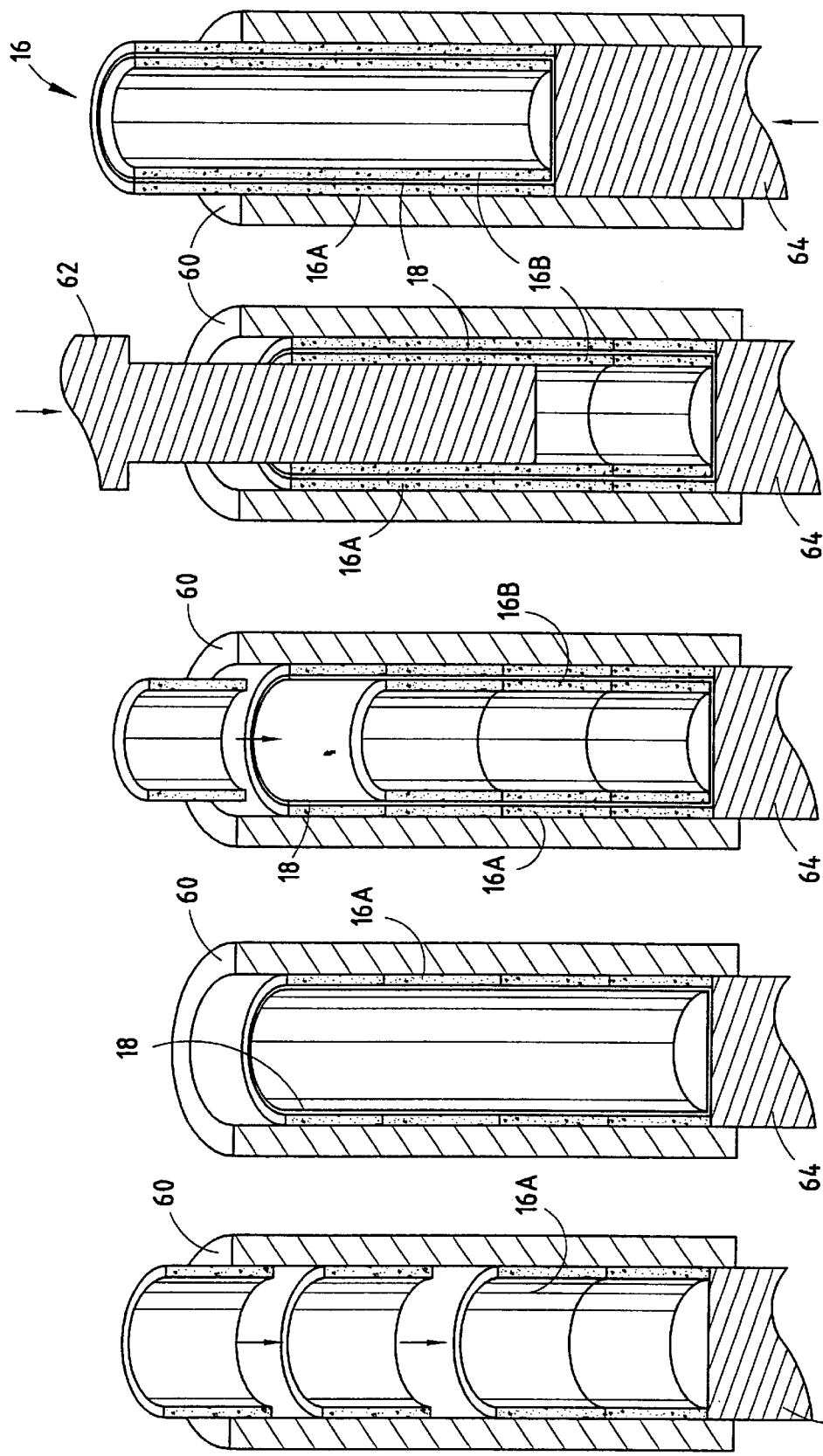

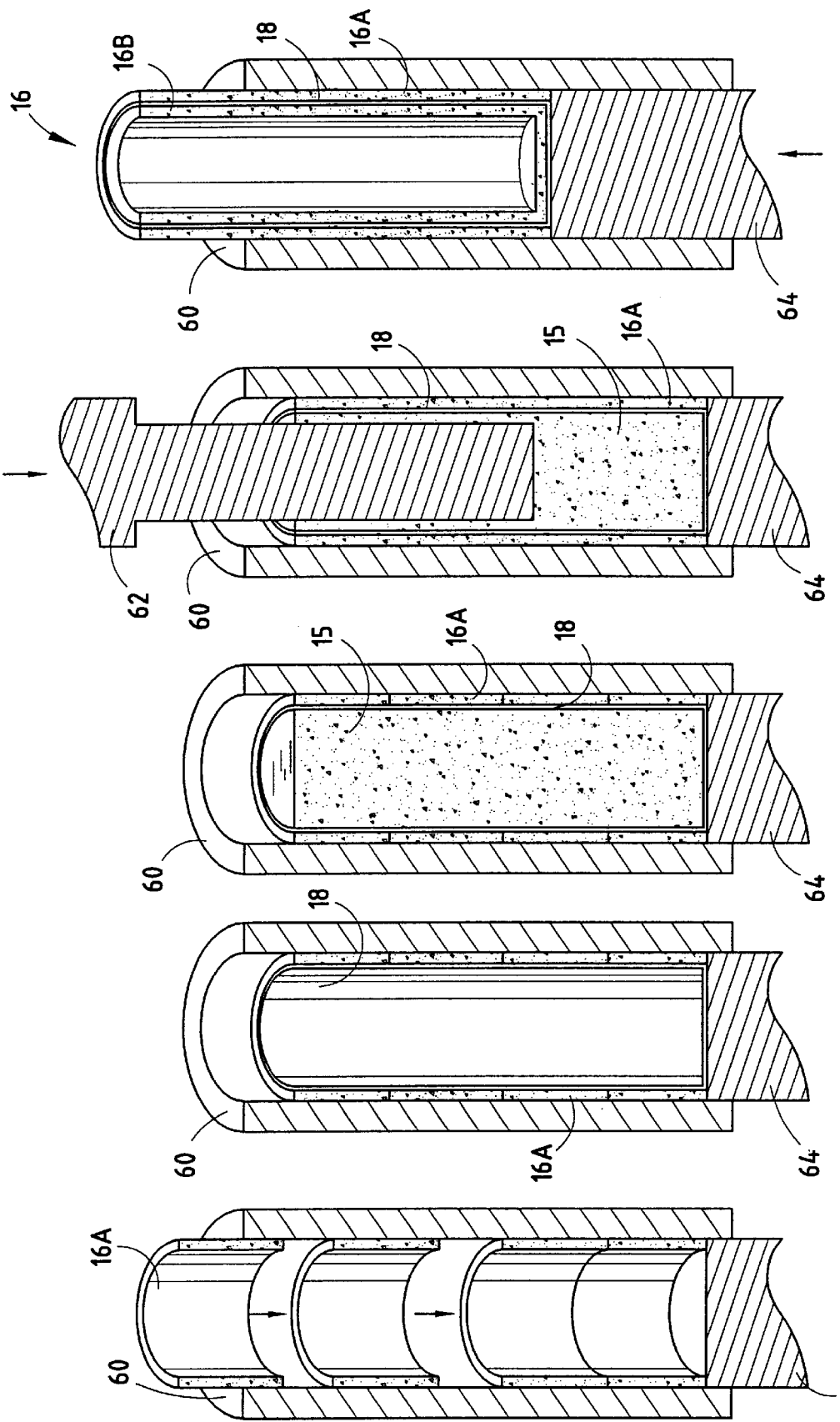

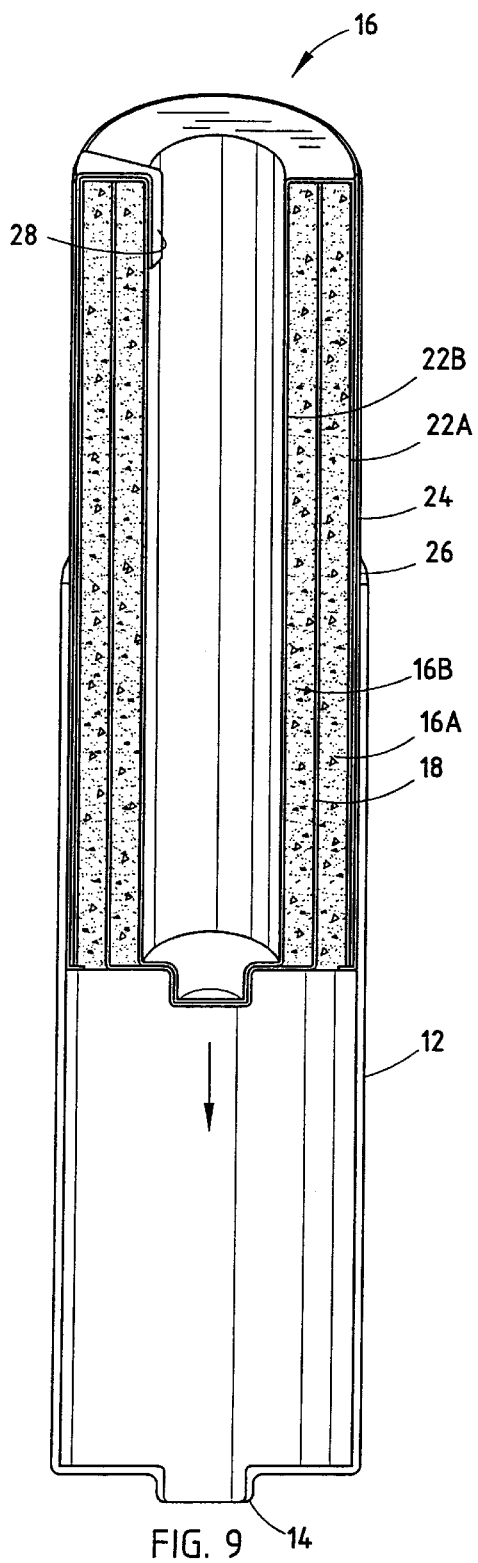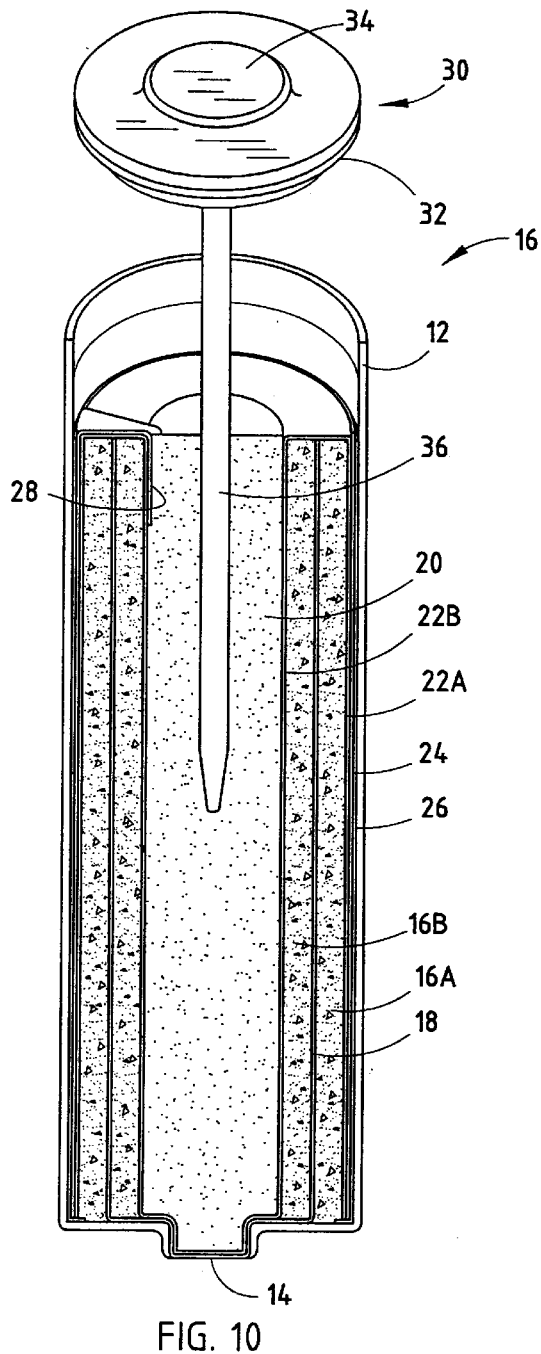
FIG. 9
FIG. 10

HIGH RATE ELECTROCHEMICAL CELL WITH INCREASED ANODE-TO-CATHODE INTERFACE SURFACE AREA

BACKGROUND OF THE INVENTION

The present invention generally relates to an electrochemical cell and, more particularly, relates to a high rate capable electrochemical cell having an increased anode-to-cathode interface surface area.

Electrochemical cells are commonly employed to supply voltage for electrically operated devices, and particularly for portable electrically operated devices. Currently, the popular alkaline cells of the generally cylindrical type are commercially available in industry standard sizes including D-, C-, AA-, AAA-, and AAAA-size cells, as well as other sizes and configurations. Electrochemical cells, such as the aforementioned type, commonly provide a predetermined open circuit voltage supply.

Conventional cylindrical alkaline cells generally have a cylindrical-shaped steel can provided with a positive cover at one end and a negative cover at the opposite end. The cylindrical cell has a positive electrode, commonly referred to as the cathode, which is often formed of a mixture of manganese dioxide, graphite, potassium hydroxide solution, deionized water, and a TEFLON® solution formed about the interior side surface of the cylindrical steel can. A cup-shaped separator is generally centrally disposed in an inner cylindrical volume of the can about the interior surface of the cathode. A negative electrode, commonly referred to as the anode, is typically formed of zinc powder, a gelling agent, and other additives, and is disposed within the separator. An electrolyte solution is also disposed in the can. One example of a conventional cylindrical cell is disclosed in U.S. Pat. No. 5,501,924, which is hereby incorporated by reference.

Conventional cells of the aforementioned cylindrical type commonly have a single anode and a single cathode contained within the steel can, with the separator interfaced between the two electrodes. With the bobbin type cell construction, the cathode is disposed adjacent the inner wall of the steel can, while the anode is disposed within a cylindrical volume centrally formed in the cathode. Accordingly, the separator has an anode-to-cathode interface surface area generally defined by the shape and size of the anode and the cathode. With the conventional bobbin type cell, the anode-to-cathode interface surface area is approximately equal to the surface defining the periphery of the cylindrical anode.

Another cell construction, commonly referred to as the jelly-roll cell construction, employs a sheet of anode and a sheet of cathode tightly wound together with a separator interdisposed between the two electrode sheets. While conventional jelly-roll wound cells offer high rate capability with a large anode-to-cathode interface area, such cells have inherent limitations. For instance, the process of forming jelly-roll cells is time consuming and relatively expensive. Further, the jelly-roll separator consumes a relatively large amount of available volume, thereby compromising the volume that remains for active cell materials.

A primary goal in designing alkaline cells is to increase the service performance which is the length of time for the cell to discharge under a given load to a specific voltage at which the cell is no longer useful for its intended purpose. Commercially available alkaline cells have an external size that is defined by industry standards, thereby limiting the ability to increase the amount of active materials that can be utilized. Conventional approaches for improving high rate performance have focused on increasing the efficiency of the internal cell materials. The need for high rate capable cells is becoming even more important with the increasing demand from consumers using high tech, high drain electronics devices. To meet this demand, the need to find ways to increase high rate service performance remains a primary goal of the cell designers.

SUMMARY OF THE INVENTION

The present invention improves the high rate performance of an electrochemical cell by providing an easy-to-manufacture cell construction having an enhanced anode-to-cathode interfacial surface area to realize improved high rate service performance. To achieve this and other advantages, and in accordance with the purpose of the invention as embodied and described herein, the present invention provides an electrochemical cell including a container comprising a closed bottom end and an open top end. The cell contains a first electrode that is integrally formed with a conductive grid current collector embedded therein. In addition, the cell further has an outer electrochemically active layer formed around the first electrode and separated therefrom by a separator. The first electrode and a second electrode are disposed in the container and separated from each other via a separator. The outer electrochemically active layer is in electrical contact with the second electrode, and a current collector is disposed in contact with the second electrode. A cover assembly is assembled to the open end of the container.

According to the assembly method of the present invention, a first electrode is formed having a conductive grid current collector integrally embedded therein. An outer separator covers the outer surface of the first electrode. An outer electrochemically active layer is disposed on top of the outer separator, and therefore wraps around the outside of the first electrode. The first electrode, outer electrochemically active layer and separator are disposed as a bobbin assembly into a container having a closed bottom end and an open top end. An inner separator is disposed in an inner cylindrical volume in the first electrode. A second electrode is disposed in the inner cylindrical volume of the first electrode and against the inner separator. A current collector is disposed in contact with the second electrode and the outer electrochemically active layer. A cover assembly is assembled to the open end of the container.

These and other features, advantages and objects of the present invention will be further understood and appreciated by those skilled in the art by reference to the following specification, claims and appended drawings.

BRIEF DESCRIPTION OF THE DRAWINGS

In the drawings:

FIGS. 4A–4E are cross-sectional views of a die assembly illustrating the assembly of the cathode bobbin using a ring molding technique according to a second embodiment;

FIGS. 5A–5E are cross-sectional views of a die assembly illustrating the assembly of the cathode bobbin using a combination of impact and ring molding according to a third embodiment;

FIG. 9 is a cross-sectional assembly view of a partially assembled electrochemical cell illustrating insertion of the cathode bobbin into the steel can; and FIG. 10 is a cross-sectional assembly view of the electrochemical cell illustrating insertion of the collector and seal assembly into the steel can.

DETAILED DESCRIPTION OF THE PREFERRED EMBODIMENTS

Figure 1:
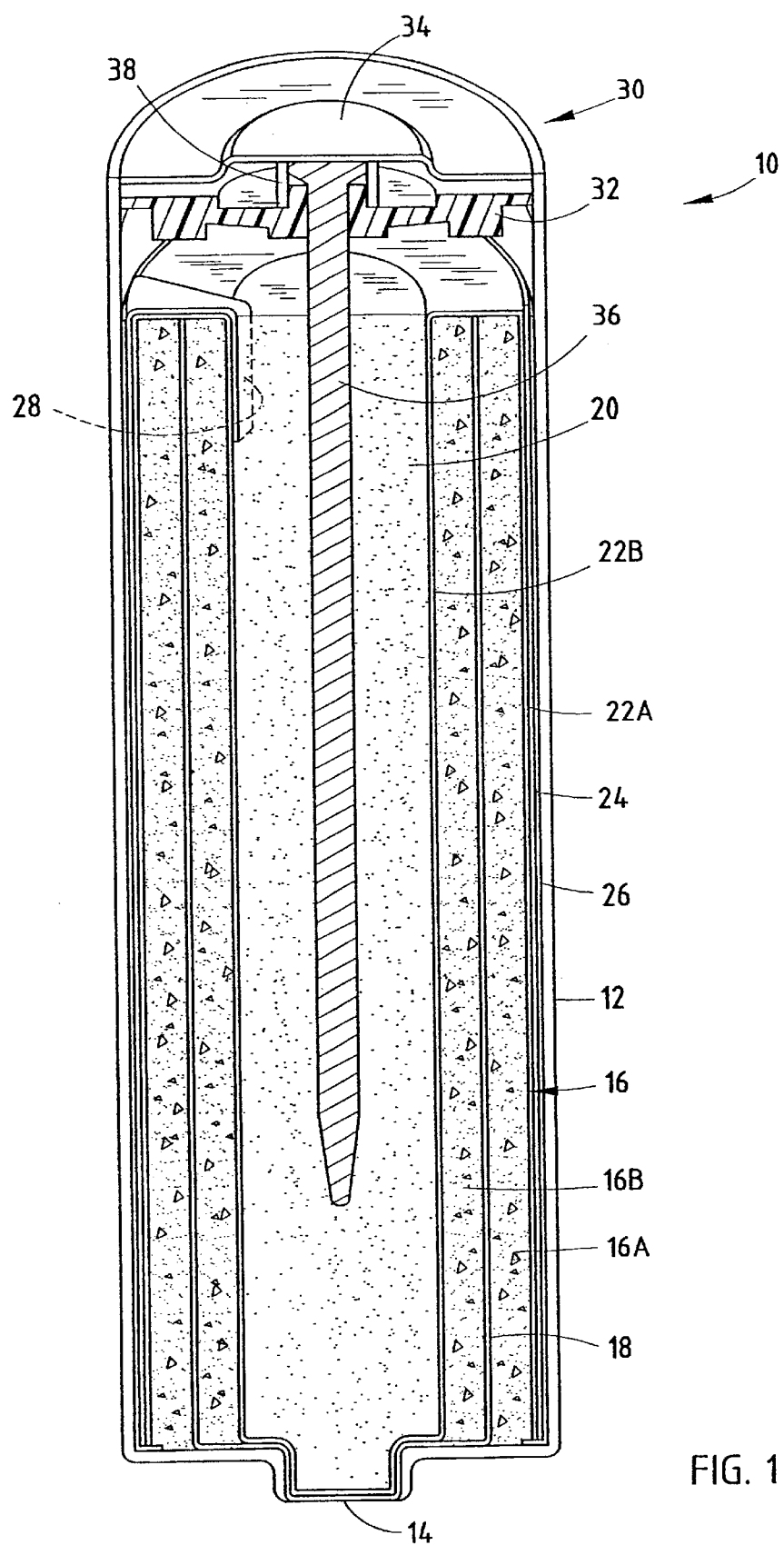
FIG. 1 is a cross-sectional view of a high rate capable electrochemical cell constructed in accordance with the present invention.

Referring to FIG. 1, a cross-sectional view of a cylindrical alkaline electrochemical cell 10 is shown therein constructed according to the present invention. The electrochemical cell 10 is constructed with enhanced interfacial surface area between the positive and negative electrodes to increase current carrying capacity to thereby achieve high rate performance capability with capacity efficiency. While electrochemical cell 10 is described in connection with a cylindrical alkaline zinc/$MnO_2$ cell, it should be appreciated that the cell construction of the present invention is applicable to various types of cells including lithium, alkaline air, and air-assisted cells, and may be configured in different cell sizes and configurations.

Electrochemical cell 10 includes a steel can 12 having a cylindrical shape with a closed bottom end and an open top end. Steel can 12 has a protruding nub 14 integrally formed in the bottom closed end which serves as the cell's positive contact terminal. Alternately, steel can 10 may be formed with a flat bottom end, in which the protruding nub 14 can be welded or otherwise attached to the exterior to form the positive contact terminal. Additionally, a metalized, plastic film label (not shown) may be formed about the exterior surface of steel can 12, except for the ends thereof.

The electrochemical cell 10 of the present invention employs a bobbin-type cell construction having a positive electrode, referred to herein as the cathode 16, and a negative electrode, referred to herein as the anode 20. The cathode 16 is molded into a bobbin-type construction and is disposed into steel can 12, and the anode 20 is dispensed in an inner cylindrical volume of the cathode 16. According to the present invention, an outer layer of electrochemically active material, referred to as a zinc strip 24, is also provided in steel can 12. Zinc strip 24 is a thin sheet of metal foil that contains an electrochemically active material, and more particularly contains zinc to provide a negative electrode. Zinc strip 24 is preferably thin, with a thickness on the order of approximately 1 mil; however, different thicknesses of zinc strip could be employed. Alternatively, the outer anode 24 can be made of other anode materials which may include lithium, cadmium, metal hydride, or other anode materials. The forms of the outer anode 24 may include foam, bonded powder, perforated or expanded metals, or others. The inner anode 20 and zinc strip 24 cover both sides of cathode 16 to provide for an increase in the anode-to-cathode surface interface area, which provides for a reduction in current density and provides for enhanced high rate service performance.

The cathode is formed into a bobbin 16 made up of an outer cathode layer 16A and an inner cathode layer 16B. The cathode 16A and 16B is preferably formed of a mixture of manganese dioxide, graphite, 45% potassium hydroxide solution, deionized water, and aqueous TEFLON® solution, and any additives. The cathode bobbin 16 is molded such that a conductive nickel grid 18 is embedded between inner and outer cathode layers 16A and 16B. The conductive grid 18, which is preferably basket-shaped, is therefore integrally formed between inner and outer cylindrical cathode layers 16A and 16B. The conductive grid 18 may be made of woven wire or metal foil coated with a carbon conductive coating and provides a conductive current path having a large contact surface area contacting cathode 16.

Disposed on both the inside and outside surface of the cathode is a separator material. The separator material includes an inner separator 22B which may be formed of a non-woven fabric that is formed in a cup-shaped configuration to cover the inner cylindrical walls of the cathode 16B. Also provided is an outer separator 22A which may be made up of a sheet of non-woven material covering the outer walls of cathode 16A. While the separator material is shown having a first cup-shaped separator 22B to cover the inner walls of the cathode and outer separator 22A wrapped around the outside walls of the cathode, a single separator piece may be formed to provide the same overall configuration. Alternately, the separator material may be applied as a liquid separator 22' as explained herein. In any event, the separator covers the inside surface of the cathode, as well as the outside surface.

The anode 20 is disposed within the inner cylindrical volume of cathode 16 and separated therefrom via the inner separator 22B. Anode 20 is preferably formed of zinc powder, a gelling agent, and other additives, according to one embodiment. However, anode 20 may include a powdered or gel matrix anode, e.g., zinc powder/carbopol gel, or could alternately include a lithium powder coated with TEFLON®.

To increase the anode-to-cathode surface interface area, a layer of electrochemically active material is provided as zinc strip 24, and is disposed around the outside surface of the cathode 16A, on the outside surface of the separator 22A. The outer layer 24 of zinc strip provides an electrochemically active anode material that acts as another negative electrode. The zinc strip 24 is assembled to be in conductive contact with the anode 20 by way of a conductive tab 28. Zinc strip 24 may be in electrical contact with the anode 20, the negative collector 36, or the cell's negative terminal. In addition, a shrink-wrap dielectric layer 26 is formed on the outside surface of zinc strip layer 24 to electrically insulate the zinc strip layer 24 from the steel can 12. According to one example, the outer separator 22A has a preferred thickness of less than or equal to 2 mil (0.0502 mm), zinc strip layer 24 has a preferred thickness of less than or equal to 3 mil (0.0753 mm), and the shrink-wrap dielectric layer 26 has a preferred thickness in the range of 2 to 3 mil 0.0502–0.0753 mm).

A negative current collector 36 is disposed in the open end of steel can 12 in contact with anode 20. Negative current collector 36 may be integrally formed with seal assembly 30 which seals the open end of steel can 12. Seal assembly 30 further includes a nylon seal 32, and a negative cover 34 which is preferably welded to the negative current collector 36. Nylon seal 32 may contact a metal washer 38, and provides a sealing closure to the steel can 12. The negative cover 34 is electrically insulated from steel can 12 by way of nylon seal 32 and serves as the cell's negative contact terminal.

Figure 2:
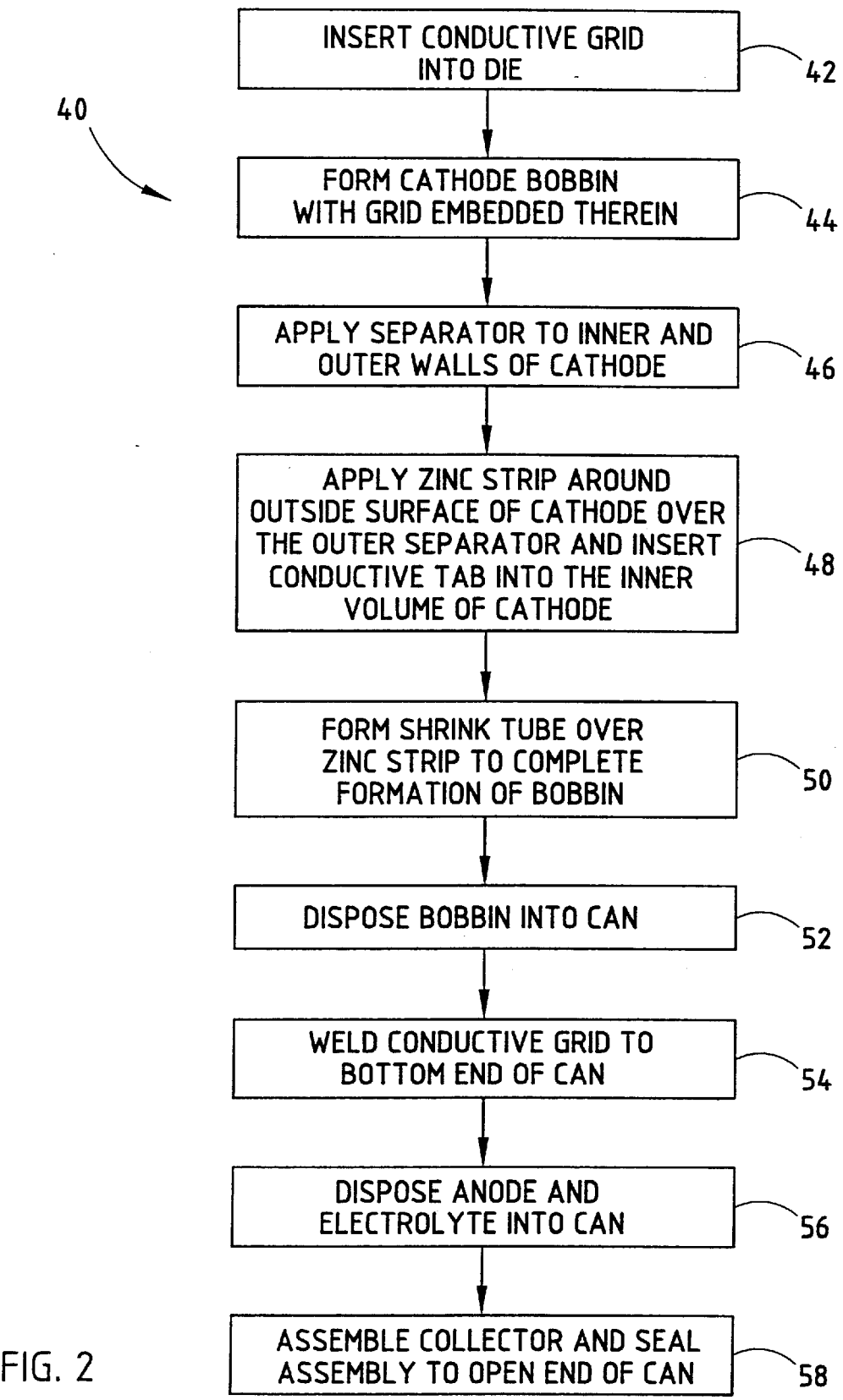
FIG. 2 is a flow diagram illustrating a methodology of assembling the electrochemical cell according to the present invention.

Referring to FIG. 2, a methodology 40 of assembling the high rate capable electrochemical cell 10 according to the present invention is illustrated therein. Cell assembly method 40 includes the step 42 of inserting the conductive grid 18 into a cathode molding die. The conductive grid 18 is made up of a basket-shaped carbon coated grid made of nickel or other suitable conductive material and is accurately located in the die so that it will be centrally formed in the cathode. Proceeding to step 44, the cathode is formed in the shape of a cylindrical bobbin with the cup-shaped conductive grid 18 embedded centrally therein. This is accomplished by placing cathode mix on both sides of the conductive grid 18, and forming the cylindrical cathode bobbin according to one of three cathode molding techniques explained herein.

Once the cathode is molded with the embedded conductive grid 18, separator material is applied to cover both the outer and inner walls of the cylindrical cathode bobbin as provided in step 46. The separator may be applied as a non-woven material or a liquid separator as explained herein. In step 48, an electrochemically active zinc strip 24 is wrapped around the outside surface of the cylindrical cathode bobbin, directly over the outer separator. The zinc strip 24 preferably includes an extended zinc tab 28. The zinc tab 28 is folded over the open end of the cathode bobbin and into the inner cylindrical cavity formed in the cathode bobbin. On the outer surface of the zinc strip 24 is formed the dielectric shrink tube to complete formation of the cathode bobbin as provided in step 50. Once the cathode bobbin assembly is complete, cell assembly methodology 40 proceeds to step 52 in which the cathode bobbin is disposed into the steel can 12. This includes disposing the cathode bobbin into the open end of steel can 12 so that the bottom cup-shaped portion of the bobbin conforms to the closed bottom end of the can. Once the bobbin is fully disposed in steel can 12, the conductive grid 18 is preferably welded to the bottom end of the can in step 54 to ensure adequate conductive contact therewith.

With the cathode bobbin assembled to the can 12, the remaining internal cell materials, including the anode and electrolyte solution are dispensed in the steel can 12 pursuant to step 56. The anode 20 may include powdered or gel-type anode that is dispensed in the inner cylindrical volume provided in the cathode bobbin. The anode 20 conforms to this shape of the inner cylindrical volume and abuts the inner separator 22B, which in turn is disposed against the inner surface of cathode 16. It should be appreciated that the anode 20 is inserted so that it contacts the zinc tab 28 such that the outer zinc strip layer 24 is in conductive contact with anode 20. Finally, once all the internal components are assembled, cell assembly methodology 40 proceeds to step 58 to assemble the negative current collector and the seal assembly to close the open end of steel can 12. The negative current collector is disposed in contact with the zinc powder or other active material in the anode 20. The seal assembly 30 provides a sealing closure to the open end of can 12, and serves to provide the cell's negative contact terminal. In addition, a metalized, plastic film label can be formed about the exterior surface of the steel can 12, except for the ends thereof to complete the cell assembly.

Figure 3C:
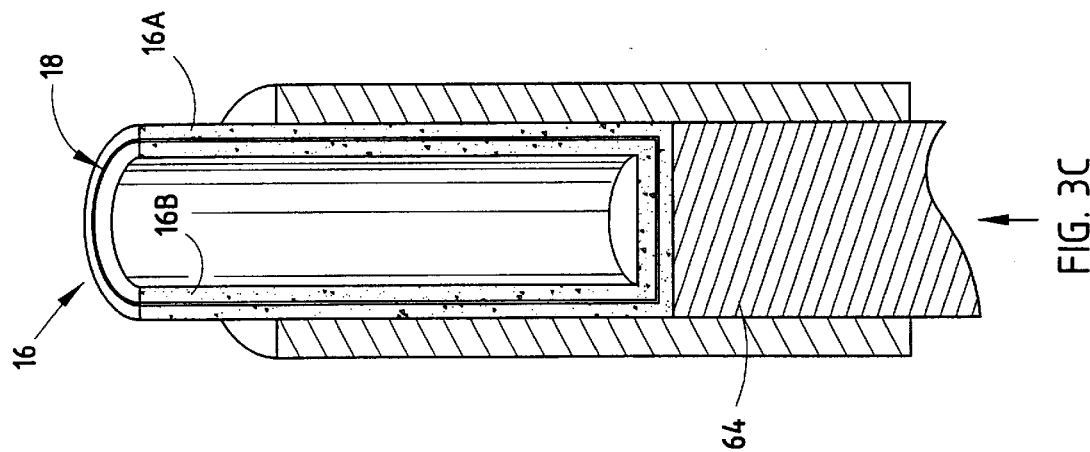
FIGS. 3A–3C are cross-sectional views of a die assembly illustrating the assembly of a cathode bobbin using full impact molding according to one embodiment.
Figure 3B:
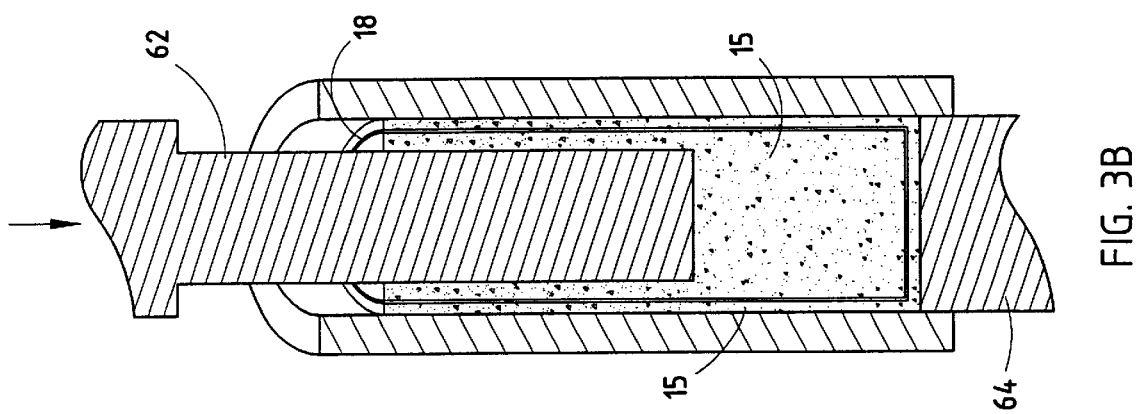
Figure 3A:
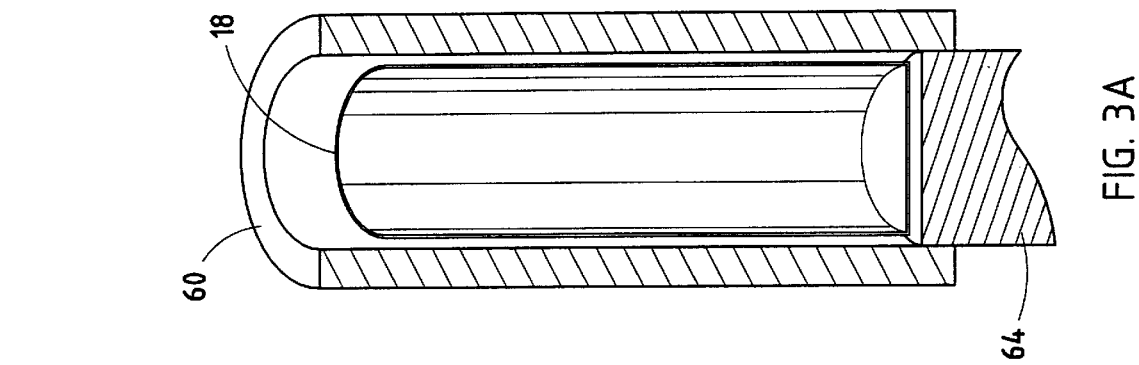

Referring to FIGS. 3–5, sequences of steps for forming a molded cathode bobbin are shown therein for each of three embodiments. With particular reference to FIGS. 3A–3C, a cathode bobbin forming process is shown using full impact molding according to a first embodiment. To begin, the basket-shaped conductive grid 18 is located in a cylindrical cathode molding die 60 as shown in FIG. 3A. The conductive grid 18 is accurately located and evenly spaced from the cylindrical walls of the die 60. Next, as shown in FIG. 3B, cathode mix 15 is dispensed in die 60 both between die 60 and conductive grid 64 as well as to substantially fill the remaining internal volume of the die 60. A ramrod 62 is then forcibly impacted into the central cylindrical volume of die 60 so as to compact the cathode mix 15 to form a rigid cathode bobbin structure with inner and outer cathode layers 16B and 16A and the conductive grid 18 integrally embedded therein. As shown in FIG. 3C, the cathode bobbin 16 is forcibly ejected from the die 60 by an ejector rod 64. The cathode bobbin 16 is then ready to receive the separator material, zinc strip, and shrink tube, prior to its dispensing into steel can 12.

Referring to FIGS. 4A–4E, a second embodiment of the cathode bobbin molding process is illustrated therein using a ring molding technique. Beginning in FIG. 4A, a series of four cathode rings are inserted into the die 60 and stacked one on top of another to form the outer cathode layer 16A. The process of forming the cathode rings generally includes adding a measured charge of cathode mix to a ring shaped die set and, with the use of a die press, molding the cathode mix into the shape of a ring. The insertion of the cathode rings into the die 60 may be achieved by press fitting the cathode rings one on top of another. The process of forming single layer ring molded cathodes is widely known in the art.

Referring particularly to FIG. 4B, the conductive grid 18 is inserted in the inner cylindrical volume of the outer cathode layer 16A within die 60. Next, four smaller diameter cathode rings are disposed in the inner cylindrical volume of the conductive grid 18, and are stacked one on top of another to form the inner cathode layer 16B as shown in FIG. 4C. Accordingly, the conductive grid 18 is embedded between the outer ring molded cathode layer 16A and the inner ring molded cathode layer 16B. As shown in FIG. 4D, a ramrod 62 is forcibly inserted centrally through the inner cylindrical volume of the cathode 16 to further compact the cathode rings together and forming a solid two-layer cathode ring with the conductive grid 18 embedded therein. Next, the cathode bobbin 16 is ejected by the ejector rod 64 as shown in FIG. 4E.

Referring to FIGS. 5A–5E, the cathode bobbin is molded according to yet another embodiment which employs a combination of ring molding and impact molding. As shown in FIG. 5A, the outer cathode layer 16A is formed by inserting four cathode rings stacked one on top of another into the die 60. Next, the conductive grid 18 is inserted on the inner face of the outer cathode layer 16A as shown in FIG. 5B. In FIG. 5C, the remaining cathode mix 15 is disposed in the die 60 to substantially fill the remaining volume of die 60, including the volume of the conductive grid 18. In FIG. 5D, ramrod 62 is forcibly injected into the inner cylindrical volume of cathode mix 15 to compact and form the inner cathode layer 16B. The ramrod 62 is removed from die 60, and the ejector rod 64 ejects the molded cathode bobbin 16 from the die 60 as shown in FIG. 5E.

Figure 6:
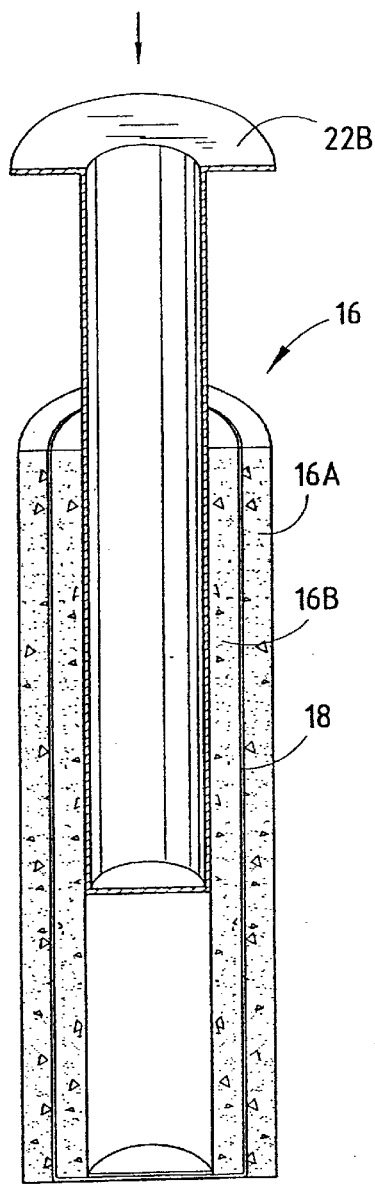
FIG. 6 is a cross-sectional view of a partially assembled cathode bobbin illustrating the assembly of a cup-shaped separator according to a first embodiment.
Figure 7:
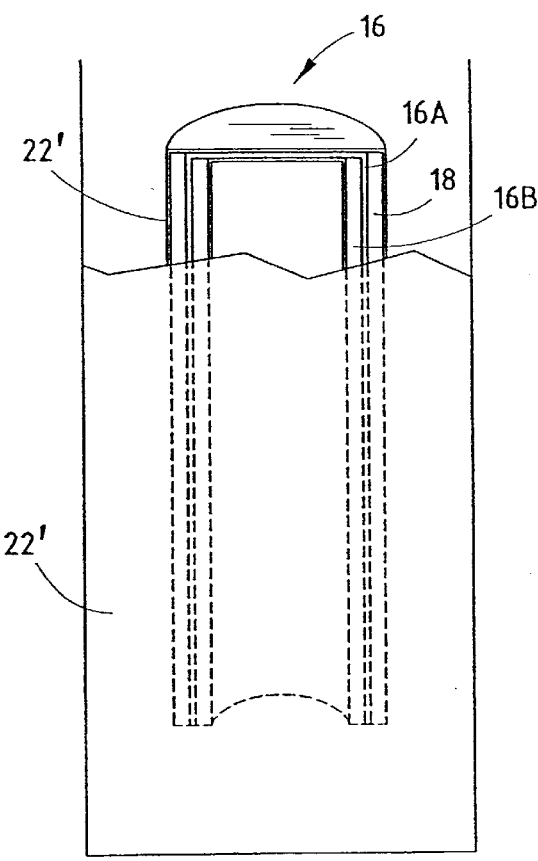
FIG. 7 is an exemplary view of the partially assembled cathode bobbin illustrating application of a liquid separator according to a second embodiment.
Figure 8:
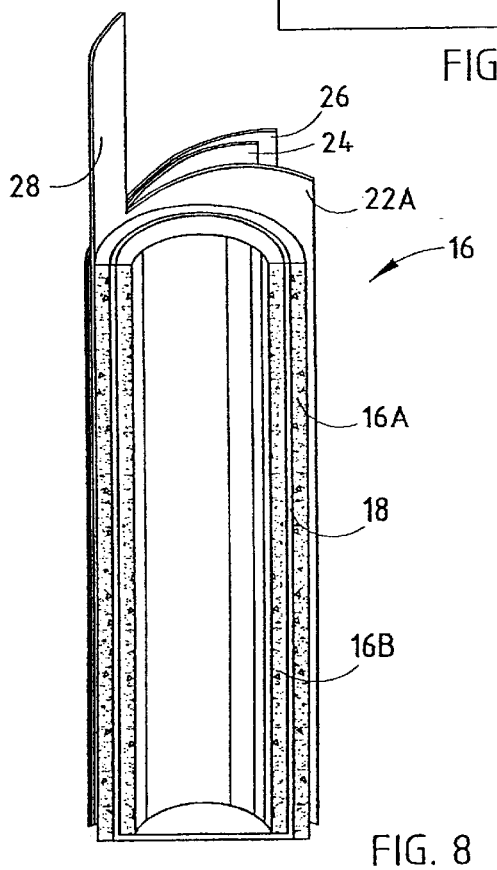
FIG. 8 is a perspective view of the cathode bobbin illustrating application of an outer separator, an electrochemically active zinc strip and a shrink-wrap coating to the outer surface.

Accordingly, the molded cathode bobbin is formed according to one of the three techniques shown and explained in connection with FIGS. 3–5, respectively. The cathode bobbin assembly is subsequently completed as shown in FIGS. 6–8. With particular reference to FIG. 6, the cup-shaped inner separator 22B is inserted in the inner cylindrical cavity that is formed in the cathode bobbin 16 so that separator 22B abuts the inside walls of the inner cathode 16B. It should be appreciated that the cup-shaped separator 22B could, alternately, be inserted after the cathode bobbin is disposed in the steel can 12, which may easily allow for the conductive grid 18 to be welded to the bottom of steel can 12 from within the inside of can 12.

As an alternative to the non-woven separator, the cathode bobbin 16 can be coated with a liquid separator 22' as shown in FIG. 7. The liquid separator 22' may include a polystyrene separator such as that disclosed in U.S. Pat. No. 4,315,062, which is hereby incorporated by reference. The liquid separator 22' is applied by dipping the cathode bobbin 16 into a container of the liquid separator 22' and subsequently removing the cathode bobbin 16 from the liquid separator and allowing the separator coating to dry. It should also be appreciated that the liquid separator 22' could be sprayed on as an alternative coating technique.

Referring to FIG. 8, a sheet of outer separator material 22A is wrapped around the outer surface of the outer cathode layer 16A. It is preferred that the outer separator 22A and inner cup-shaped separator 22B together fully cover the outer cathode walls, the inner cathode walls, and the top open end of the cathode bobbin 16. The zinc strip 24 is then wrapped around the outer surface of the outer separator 22A. Zinc strip 24 provides an electrochemically active anode material with a conductive medium. Zinc strip 24 preferably includes the extended zinc tab 28 integrally formed or attached thereto. Wrapped around the outside of the zinc sheet 24 is the dielectric shrink tube 26 which electrically insulates the zinc strip 24 from steel can 12. It should be appreciated that any combination of adjoining layers of the shrink tube 26, zinc sheet 24, and outer separator 22A could be combined in a multi-layer material, which could be applied to the outer surface of the cathode 16 with a single wrap and adhered thereto.

Referring to FIG. 9, the completed cathode bobbin 16 is shown being inserted into steel can 12. As shown, extended tab 28, which extends from zinc strip 24, is folded over and across the top open end of the cathode bobbin 16 and is further folded downward into the inner cylindrical volume thereof. The cathode bobbin 16 is press fit against the closed bottom end of steel can 12, and the bottom surface of the conductive grid 18 and cup-shaped separator 22B may reshape to conform to the shape of the integrated protruding nub 14. The conductive grid 18 is then welded to the bottom end of the can.

Once the cathode bobbin 16 is fully assembled into the can 12, the remaining internal materials are disposed in steel can 12. This includes dispensing the anode 20 into the inner cylindrical cavity provided in the cathode bobbin 16. In addition, electrolyte solution is dispensed in the can 12. Once the internal materials have been disposed inside steel can 12, the negative current collector 36 and seal assembly 30 are assembled to the open end of steel can 12. The negative current collector 36 is disposed in contact with the anode 20 to provide contact with the zinc powder found therein. It should be appreciated that negative current collector 36 is also in contact with zinc strip 24 through extended tab 28. The seal assembly 30 closes and seals the open end of steel can 12, and may provide for the negative contact terminal of electrochemical cell 10. In addition, it should be appreciated that a metalized label may be formed about the outer side walls of steel can 12.

The electrochemical cell 10 constructed according to the present invention provides for a large interfacial surface area contact between the anode and cathode, in an easy-to-assemble cell construction. This provides for an increase in overall current carrying capacity of the electrodes, and offers reduced current density and decreased thickness of the electrodes to thereby result in better discharge efficiency and higher rate capability. In addition, the assembly construction allows for use of a thinner can, since the cathode molding formation is not performed in the can.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
    a container having a closed bottom end and an open top end;
    a first electrode disposed in said container and having a first polarity, wherein said first electrode is a cathode;
    a second electrode disposed in said container and having a second polarity, wherein said second electrode is an anode, and said second electrode disposed on one side of said first electrode;
    a first current collector disposed in contact with said first electrode;
    an outer electrochemically active layer having said second polarity and disposed on another side of said first electrode;
    a separator disposed between said first electrode and said second electrode, said separator further disposed between said first electrode and said outer electrochemically active layer;
    a second current collector connected in contact with said second electrode; and
    a cover assembly assembled to said open top end of said container;
    wherein said first current collector comprises a conductive grid embedded in said first electrode, and wherein said first electrode includes an inner layer and an outer layer, with said conductive grid integrally molded between said inner and outer layers, said inner and outer layers of said first electrode each comprising more than one ring.

2. A high rate electrochemical cell comprising:
    a container;
    a first electrode disposed in said container;
    a second electrode disposed in said container and having an electrochemically active powder;
    a first current collector in contact with said first electrode;
    a first separator disposed between said first electrode and said second electrode;
    a third electrode disposed in said container, said third electrode comprising an outer electrochemically active layer having a conductive strip wrapped around said first electrode;
    a second separator disposed between said third electrode and said first electrode;
    a second current collector connected in contact with said second electrode;
    a positive terminal connected to one of said first and second current collectors; and
    a negative terminal connected to the other of said first and second current collectors, wherein said first electrode is formed as a cylindrical bobbin having a cylindrical cavity formed therein, and said second electrode is disposed centrally within said cylindrical cavity, and said third electrode is formed over the outside surface of the cylindrical bobbin, and wherein said first electrode comprises a cathode, and said second electrode comprises an anode.

3. The electrochemical cell as defined in claim 2, wherein said first current collector comprises a conductive grid.

4. The electrochemical cell as defined in claim 3, wherein said conductive grid is embedded in said first electrode.

* * * * *